(12) United States Patent
Zou et al.

(10) Patent No.: US 10,867,618 B2
(45) Date of Patent: Dec. 15, 2020

(54) SPEECH NOISE REDUCTION METHOD AND DEVICE BASED ON ARTIFICIAL INTELLIGENCE AND COMPUTER DEVICE

(71) Applicant: BAIDU ONLINE NETWORK TECHNOLOGY (BEIJING) CO., LTD., Beijing (CN)

(72) Inventors: Wei Zou, Beijing (CN); Xiangang Li, Beijing (CN); Weiwei Cui, Beijing (CN); Jingyuan Hu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 59 days.

(21) Appl. No.: 15/856,180

(22) Filed: Dec. 28, 2017

(65) Prior Publication Data

US 2018/0301158 A1    Oct. 18, 2018

(30) Foreign Application Priority Data

Apr. 14, 2017  (CN) .......................... 2017 1 0245329

(51) Int. Cl.
*G10L 21/02* (2013.01)
*G10L 21/0232* (2013.01)
(Continued)

(52) U.S. Cl.
CPC ............ *G10L 21/0232* (2013.01); *G06N 3/08* (2013.01); *G06N 20/00* (2019.01); *G10L 19/032* (2013.01);
(Continued)

(58) Field of Classification Search
CPC ....................................................... G10L 21/02
See application file for complete search history.

(56) References Cited

U.S. PATENT DOCUMENTS 5,335,312 A * 8/1994 Mekata ............... G10L 21/0208
704/202
2016/0189730 A1* 6/2016 Du ....................... G10L 21/0272
704/233

(Continued)

FOREIGN PATENT DOCUMENTS

CN           104952448        9/2015

OTHER PUBLICATIONS

SIPO, First Office Action for CN Application No. 201710245329.8, dated Sep. 20, 2019.

*Primary Examiner* — Douglas Godbold
(74) *Attorney, Agent, or Firm* — Hodgson Russ LLP

(57) ABSTRACT

Embodiments of the present disclosure provide a speech noise reduction method and a speech noise reduction device based on artificial intelligence and a computer device. The method includes the followings. A first noisy speech to be processed is received. The first noisy speech to be processed is pre-processed, to obtain the first noisy speech in a preset format. The first noisy speech in the preset format is sampled according to a sampling rate indicated by the preset format, to obtain first sampling point information of the first noisy speech. A noise reduction is performed on the first sampling point information through a deep-learning noise reduction model, to generate noise-reduced first sampling point information. A first clean speech is generated according to the noise-reduced first sampling point information.

12 Claims, 6 Drawing Sheets

(51) Int. Cl.
*G06N 3/08* (2006.01)
*G10L 19/032* (2013.01)
*G10L 21/0264* (2013.01)
*G10L 21/0208* (2013.01)
*G06N 20/00* (2019.01)

(52) U.S. Cl.
CPC ...... *G10L 21/0208* (2013.01); *G10L 21/0264* (2013.01)

(56) References Cited

U.S. PATENT DOCUMENTS

| | | | |
|---|---|---|---|
| 2017/0061978 A1* | 3/2017 | Wang | G10L 21/0232 |
| 2017/0133031 A1* | 5/2017 | Schubert | G10L 21/038 |
| 2017/0270930 A1* | 9/2017 | Ozmeral | G10L 17/005 |
| 2017/0278513 A1* | 9/2017 | Li | G10L 15/20 |
| 2018/0053087 A1* | 2/2018 | Fukuda | G06N 3/0454 |
| 2018/0374497 A1* | 12/2018 | Furuta | G10L 21/0264 |

* cited by examiner

SPEECH NOISE REDUCTION METHOD AND DEVICE BASED ON ARTIFICIAL INTELLIGENCE AND COMPUTER DEVICE

CROSS-REFERENCE TO RELATED APPLICATIONS

This application is based on and claims priority to Chinese Patent Application No. 201710245329.8, filed on Apr. 14, 2017, the entire contents of which are incorporated herein by reference.

TECHNICAL FIELD

The present disclosure relates to the field of speech processing technology, and more particularly, to a speech noise reduction method and a speech noise reduction device based on artificial intelligence (AI) and a computer device.

BACKGROUND

With the development of speech technology, speech recognition is gradually popularized in daily life. However, in daily use in various scenes, quality and intelligibility of the speech are affected due to various noise and device signal interference, and performance of a speech recognition system is greatly degraded.

SUMMARY

Embodiments of the present disclosure provide a speech noise reduction method based on AI. The method includes: receiving a first noisy speech to be processed; pre-processing the first noisy speech to be processed, to obtain the first noisy speech in a preset format; sampling the first noisy speech in the preset format according to a sampling rate indicated by the preset format, to obtain first sampling point information of the first noisy speech; performing a noise reduction on the first sampling point information through a deep-learning noise reduction model, to generate noise-reduced first sampling point information; and generating a first clean speech according to the noise-reduced first sampling point information.

Embodiments of the present disclosure provide a computer device. The computer device includes one or more processors; a storage device, configured to store one or more programs; a receiver, configured to receive a first noisy speech to be processed; in which when the one or more programs are executed by the one or more processors, such that the one or more processors execute the above-mentioned method.

Embodiments of the present disclosure provide a storage media including computer executable instructions, when the computer executable instructions are executed by a computer processor, the above method is executed.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
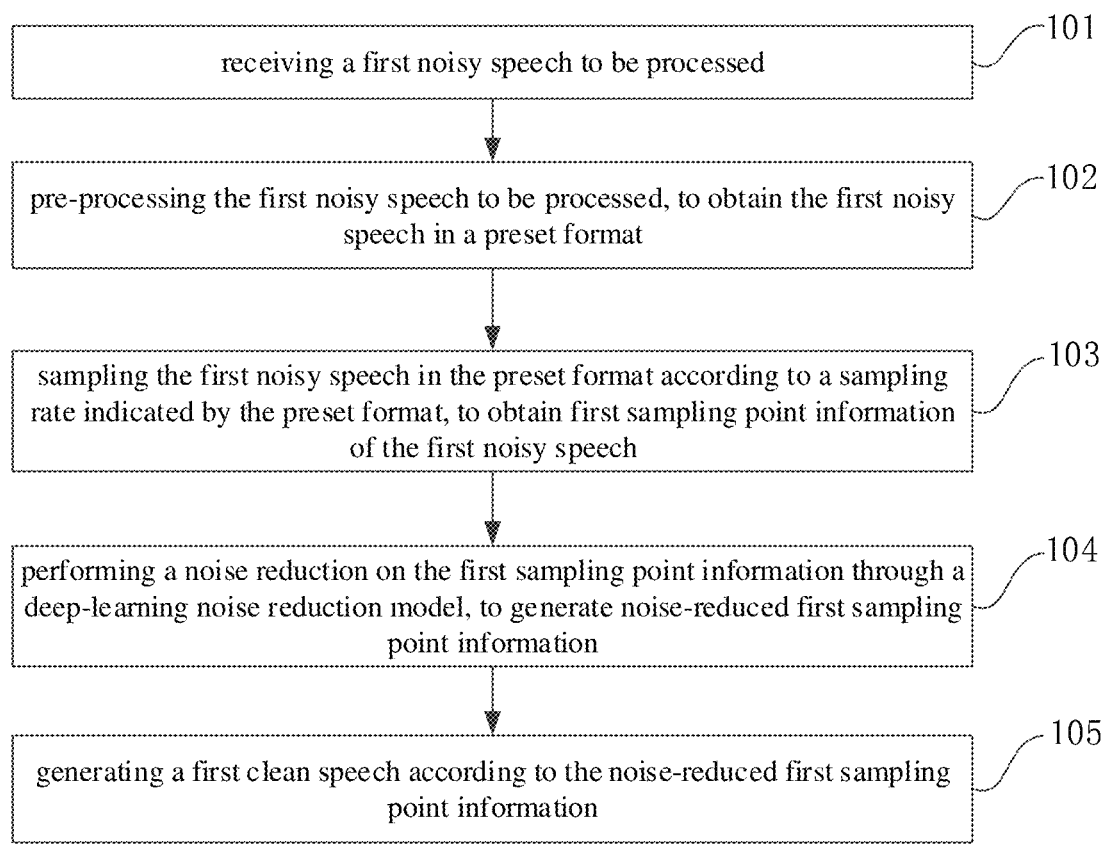
FIG. 1 is a flow chart illustrating a speech noise reduction method based on AI according to an embodiment of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure. Instead, the embodiments of the present disclosure comprise all the variants, modifications and their equivalents within the spirit and scope of the present disclosure as defined by the appended claims Artificial Intelligence (short for AI) is a new technical science studying and developing theories, methods, techniques and application systems for simulating, extending and expanding human intelligence. AI is a branch of computer science, which attempts to know the essence of intelligence and to produce an intelligent robot capable of acting as a human. The researches in this field include robots, speech recognition, image recognition, natural language processing and expert systems, etc.

In the related art, the speech noise reduction methods mainly include the followings.

1. Based on a spectrum subtraction method, a speech signal is converted from time domain to frequency domain, and then an impact of a noise signal is removed from a spectrum signal.

2. Based on a filter method, by designing a special noise reduction filter, an impact of the noise signal is weakened.

However, the above methods have the following disadvantages.

1. It needs to estimate noise in a noisy speech, which is difficult to implement and has an unsatisfactory result.

2. When the technology in the related art is used to operate on the spectrum signal, it is easy to cause loss of information and distortion of the speech signal and affect intelligibility and naturalness of the speech.

3. One speech noise reduction technology is only applicable to a specific noise environment and type, technology promotion is poor.

FIG. 1 is a flow chart illustrating a speech noise reduction method based on AI according to an embodiment of the present disclosure. As illustrated in FIG. 1, the speech noise reduction method based on AI includes the followings.

In block 101, a first noisy speech to be processed is received.

In block 102, the first noisy speech to be processed is pre-processed, to obtain the first noisy speech in a preset format.

The preset format may be a pulse code modulation (PCM hereafter) format with a sampling rate of 16000 Hz (i.e., 16000 sampling points are included in a speech having a period of 1 second), 16-bit quantization, and a single channel.

Certainly, the above preset format is not limited in embodiments. The preset format may be set according to actual requirements and/or system performances when the preset format is implemented.

In block 103, the first noisy speech in the preset format is sampled according to a sampling rate indicated by the preset format, to obtain first sampling point information of the first noisy speech.

In embodiments, after the first noisy speech to be processed is processed as the first noisy speech in the preset format, the first noisy speech in the preset format may be sampled according to the sampling rate (such as 16000 Hz) indicated by the preset format, so as to obtain the first sampling point information of the first noisy speech.

In block 104, a noise reduction is performed on the first sampling point information through a deep-learning noise reduction mode, to generate noise-reduced first sampling point information.

In detail, after the first sampling point information of the first noisy speech is obtained, the first sampling point information of the first noisy speech may be used as an input of the deep-learning noise reduction mode. Through the deep-learning noise reduction model, the first sampling point information of the first noisy speech may be de-noised, so as to generate the noise-reduced first sampling point information having a corresponding time point.

In block 105, a first clean speech is generated according to the noise-reduced first sampling point information.

In embodiments, after the noise-reduced first sampling point information is generated by the deep-learning noise reduction mode, the first clean speech may be generated according to the above noise-reduced first sampling point information.

In the speech noise reduction method based on AI, after the first noisy speech to be processed is received, the first noisy speech to be processed is pre-processed, so as to generate the first noisy speech in the preset format. The first noisy speech in the preset format is sampled with the sampling rate indicated by the preset format, to obtain the first sampling point information of the first noisy speech. Through the deep-learning noise reduction model, the noise reduction is preformed to the first sampling point information, to generate the noise-reduced first sampling point information. The first clean speech is generated according to the noise-reduced first sampling point information. The first clean speech is generated according to the noise-reduced first sampling point information. The method employs directly the sampling point information as the input and the output of the deep-learning noise reduction model without operating on the spectrum and complex operations such as estimating noise. Therefore the method is simple to implement. Furthermore, the method may not bring distortion (such as "music" noise), thereby having a better naturalness and acoustic quality and providing better user experience. In addition, by learning a large amount of noisy speeches and clean speeches through the deep-learning model, a capacity of generating the clean speech from the noisy speech using the deep-learning method is applicable to various types of noise and various environments, which has a general applicability and is easily to promote.

Figure 2:
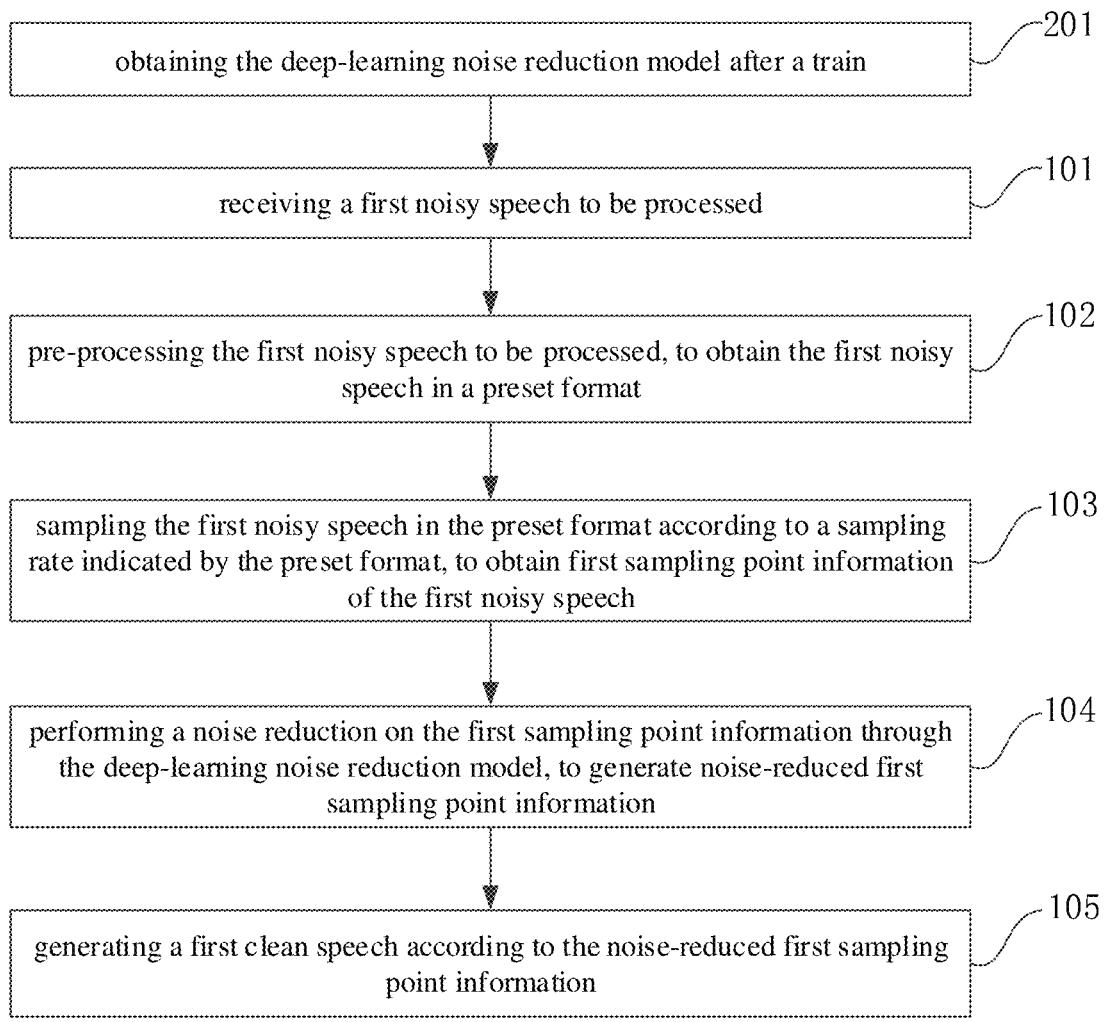
FIG. 2 is a flow chart illustrating a speech noise reduction method based on AI according to another embodiment of the present disclosure.

FIG. 2 is a flow chart illustrating a speech noise reduction method based on AI according to another embodiment of the present disclosure. As illustrated in FIG. 2, before the block 101 as illustrated in FIG. 1, the method further includes the followings.

In block 201, the deep-learning noise reduction model is generated after a train.

The block 201 being executed before the block 101 as illustrated in FIG. 2 is an example for illustrating. However, embodiments of the present disclosure are not limited thereto. The block 201 may be executed before or after the blocks 101 to 103, or may be executed concurrently with the blocks 101 to 103, which are not limited in embodiments of the present disclosure.

Figure 3:
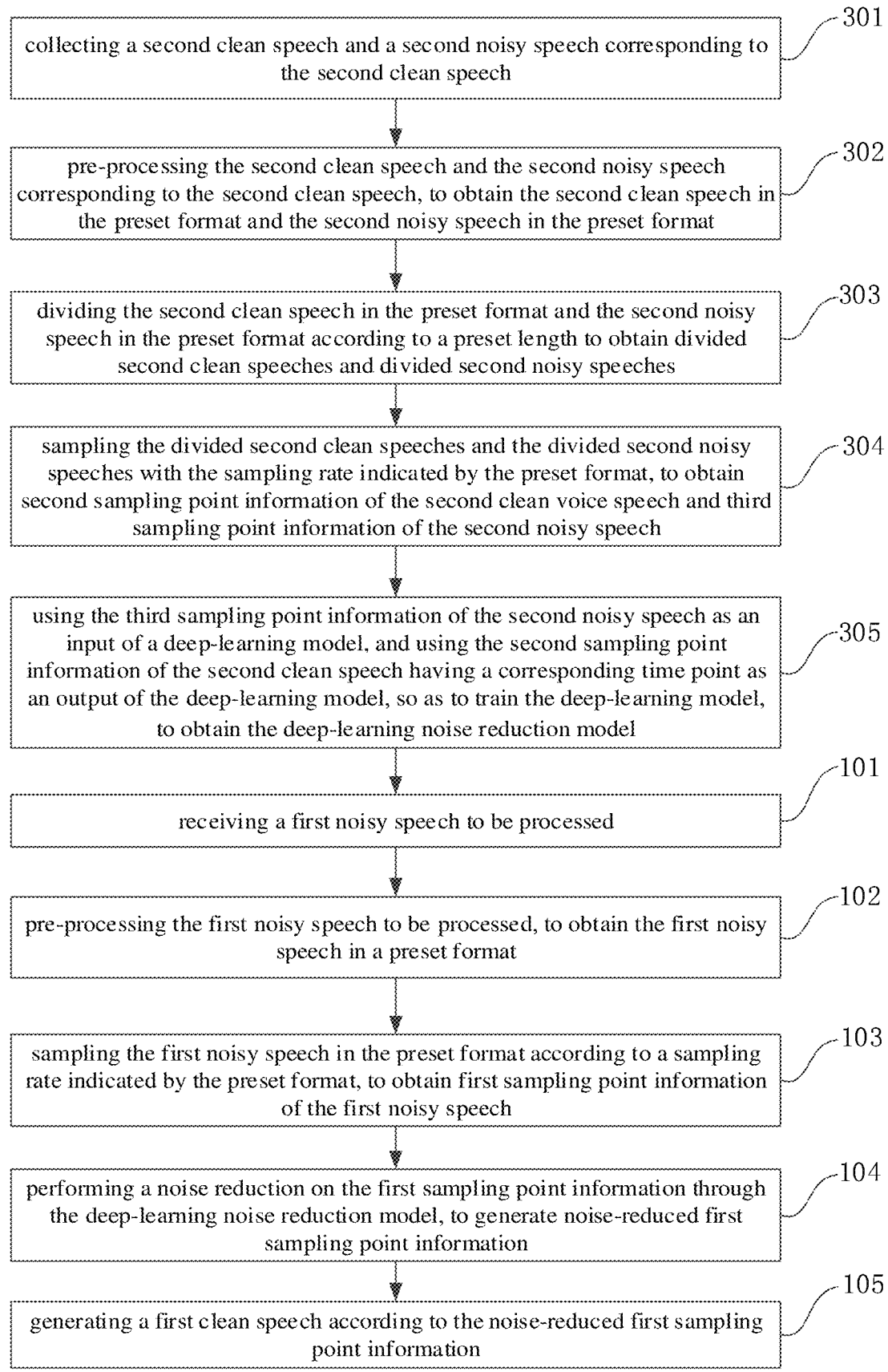
FIG. 3 is a flow chart illustrating a speech noise reduction method based on AI according to still another embodiment of the present disclosure.

FIG. 3 is a flow chart illustrating a speech noise reduction method based on AI according to still another embodiment of the present disclosure. As illustrated in FIG. 3, the block 201 in embodiments illustrated as FIG. 2 may include the followings.

In block 301, a second clean speech and a second clean speech corresponding to the second clean speech are collected.

On specific implementation, when the second clean speech and the second noisy speech corresponding to the second clean speech are collected, the second clean speech may be collected firstly, and then noise (such as noise of automobile environment) is added to the second clean speech, so as to obtain the second noisy speech corresponding to the second clean speech.

In block 302, the second clean speech and the second noisy speech corresponding to the second clean speech are pre-processed, to obtain the second clean speech in the preset format and the second noisy speech in the preset format.

The above preset format may be a PCM format with a sampling rate of 16000 Hz (i.e., 16000 sampling points included in a speech with a period of 1 second), 16-bit quantization and a single channel.

Certainly, the above preset format is not limited in embodiments of the present disclosure. The preset format may be set according to actual requirements and/or system performances when the preset format is implemented.

In block 303, the second clean speech in the preset format and the second noisy speech in the preset format are divided according to a preset length, to obtain divided second clean speeches and divided second noisy speeches.

In embodiments, after the second clean speech and the second noisy speech corresponding to the second clean speech are pre-processed, it also requires dividing the second clean speech in the preset format and the second noisy speech in the present format according to a preset length, such that the second clean speech in the preset format and the second noisy speech in the preset format are divided to speech segments having the same preset length respectively.

The above preset length may be set according to actual requirements and/or system performances when the preset length is implemented. The above preset length is not limited in embodiments of the present disclosure. For example, the above preset length may be 1.25 seconds.

In block 304, the divided second clean speeches and the divided second noisy speeches obtained by dividing the second clean speech in the preset format the second noisy speech in the preset format are sampled to obtain second sampling point information of the second clean speech and third sampling point information of the second noisy speech.

In embodiments of the preset disclosure, after the second clean speech in the preset format and the second noisy speech in the preset format are divided, the divided second clean speeches and the divided second noisy speeches are sampled according to the sampling rate (i.e. 16000 Hz) indicated in the preset format, so as to obtain the second sampling point information of the second clean speech and the third sampling point information of the second noisy speech.

In block 305, the third sampling point information of the second noisy speech is used as an input of a deep-learning model, and the second sampling point information of the second clean speech with a corresponding time point is used as an output of the deep-learning model, so as to train the deep-learning mode to obtain the deep-learning noise reduction model.

In detail, after the second sampling point information of the clean speech and the third sampling point information of the noisy speech are obtained, the third sampling point information of the noisy speech is used as the input of the deep-learning model and the second sampling point information of the second clean speech with the corresponding time point is used as the output of the deep-learning model, so as to train the deep-learning model. That is, the deep-learning noise reduction model may be acquired. Certainly, a process of training the deep-learning model further includes a parameter selection and adjustment, which is not elaborated herein.

The above speech noise reduction method based on AI employs directly the sampling point information as the input and the output of the deep-learning noise reduction mode without operating on the spectrum and complex operations such as estimating noise. Therefore the method is simple to implement. Furthermore, the method may not bring distortion (such as "music" noise), thereby having a better naturalness and acoustic quality and providing better user experience. In addition, by learning a large amount of noisy speeches and clean speeches through the deep-learning model, a capacity of generating the clean speech from the noisy speech using the deep-learning method is applicable to various types of noise and various environments, which has a general applicability and is easily to promote.

Figure 4:
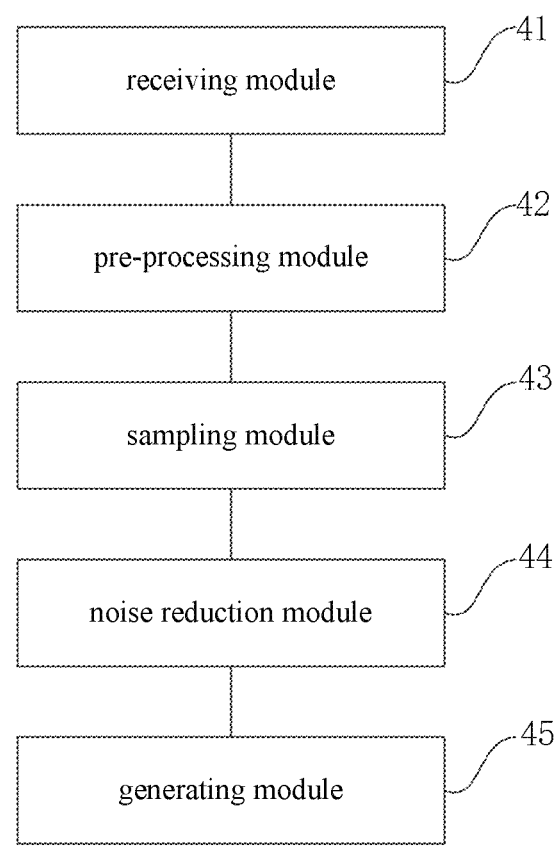
FIG. 4 is a block diagram illustrating a speech noise reduction device based on AI according to an embodiment of the present disclosure.

FIG. 4 is a block diagram illustrating a speech noise reduction device based on AI according to an embodiment of the present disclosure. The speech noise reduction device based on AI illustrated in embodiments may implement the method provided in embodiments illustrated in FIGS. 1-3. As illustrated in FIG. 4, the above speech noise reduction device based on AI may include a receiving module 41, a pre-processing module 41, a sampling module 43, a noise reduction module 44 and a generating module 45.

The receiving module 41 is configured to receive a first noisy speech to be processed.

The pre-processing module 42 is configured to pre-process the first noisy speech to be processed, to obtain the first noisy speech in a preset format.

The preset format may be a pulse code modulation (PCM hereafter) format with a sampling rate of 16000 Hz (i.e., 16000 sampling points are included in a speech having a period of 1 second), 16-bit quantization, and a single channel.

Certainly, the above preset format is not limited in embodiments. The preset format may be set according to actual requirements and/or system performances when the preset format is implemented.

The sampling module 43 is configured to sample the first noisy speech in the preset format obtained by the pre-processing module 42 according to a sampling rate indicated by the preset format, to obtain first sampling point information of the first noisy speech. In embodiments, after the first noisy speech to be processed is processed as the first noisy speech in the preset format, the first noisy speech in the preset format may be sampled by the sampling module 43 according to the sampling rate (such as 16000 Hz) indicated by the preset format, so as to obtain the first sampling point information of the first noisy speech.

The noise reduction module 44 is configured to perform a noise reduction on the first sampling point information obtained by the sampling module 43 through a deep-learning noise reduction model, to generate noise-reduced first sampling point information. In detail, after the first sampling point information of the first noisy speech is obtained, the first sampling point information of the first noisy speech may be used by the noise reduction module 44 as an input of the deep-learning noise reduction mode. Through the deep-learning noise reduction model, the first sampling point information may be de-noised, so as to generate the noise-reduced first sampling point information having a corresponding time point.

The generating module 45 is configured to generate a first clean speech according to the noise-reduced first sampling point information obtained by the noise reduction module 44. In embodiments, after the noise-reduced first sampling point information is generated by the deep-learning noise reduction mode, the first clean speech may be generated by the generating module 45 according to the above noise-reduced first sampling point information.

In the speech noise reduction device based on AI, after the first noisy speech to be processed is received by the receiving module 41, the first noisy speech to be processed is pre-processed by the pre-processing module 42, so as to generate the first noisy speech in the preset format. The first noisy speech in the preset format is sampled by the sampling module 43 with the sampling rate indicated by the preset format, to obtain the first sampling point information. Through the deep-learning noise reduction model, the noise reduction is performed by the noise reduction module 44 to the first sampling point information, to generate the noise-reduced first sampling point information. The first clean speech is generated by the generating module 45 according to the noise-reduced first sampling point information. The device employs directly the sampling point information as the input and the output of the deep-learning noise reduction model without operating on the spectrum and complex operations such as estimating noise. Therefore the device is simple to implement. Furthermore, the device may not bring distortion (such as "music" noise), thereby having a better naturalness and acoustic quality and providing better user experience. In addition, by learning a large amount of noisy speeches and clean speeches through the deep-learning model, a capacity of generating the clean speech from the noisy speech using the deep-learning method is applicable to various types of noise and various environments, which has a general applicability and is easily to promote.

Figure 5:
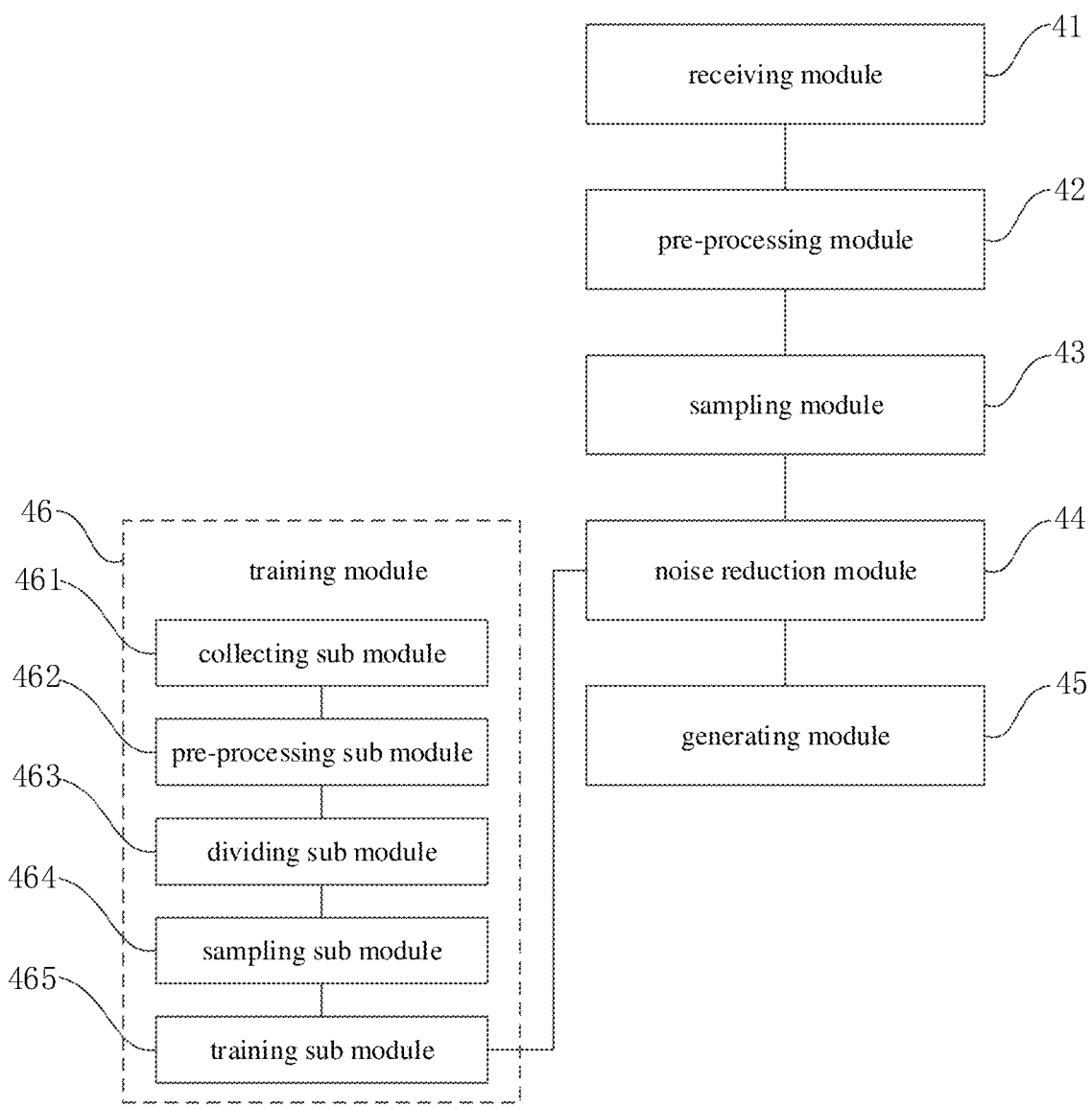
FIG. 5 is a block diagram illustrating a speech noise reduction device based on AI according to another embodiment of the present disclosure.

FIG. 5 is a block diagram illustrating a speech noise reduction device based on AI according to another embodiment of the present disclosure. Comparing with the speech noise reduction device based on AI illustrated as FIG. 4, the speech noise reduction device based on AI illustrated as FIG. 5 may further include a training module 46.

The training module 46 is configured to obtain the deep-learning noise reduction model after a train before the noise reduction is performed by the noise reduction module 44 on the first sampling point information through the deep-learning noise reduction model, to generate the noise-reduced first sampling point information.

In embodiments, the training module 46 may include a collecting sub module 461, a pre-processing sub module 462, a dividing sub module 463, a sampling sub module 464 and a training sub module 465.

The collecting sub module 461 is configured to collect a second clean speech and a second noisy speech corresponding to the second clean speech. On specific implementation, when the second clean speech and the second noisy speech corresponding to the second clean speech are collected by the collecting sub module 461, the second clean speech may be collected firstly, and then noise (such as noise of automobile environment) is added to the second clean speech, so as to obtain the second noisy speech corresponding to the second clean speech.

The pre-processing sub module 462 is configured to pre-process the second clean speech collected by the collecting sub module 461 and the second noisy speech corresponding to the second clean speech and collected by the collecting sub module 461, to obtain the second clean speech in the preset format and the second noisy speech in the preset format. The above preset format may be a PCM format with a sampling rate of 16000 Hz (i.e., 16000 sampling points included in a speech with a period of 1 second), 16-bit quantization and a single channel.

Certainly, the above preset format is not limited in embodiments of the present disclosure. The preset format may be set according to actual requirements and/or system performances when the preset format is implemented.

The dividing sub module 463 is configured to divide the second clean speech in the preset format and the second noisy speech in the preset format obtained by the pre-processing sub module 462 according to a preset length to obtain divided second clean speeches and divided second noisy speeches. In embodiments, after the second clean speech and the second noisy speech corresponding to the second clean speech are pre-processed by the pre-processing sub module 462, it also requires dividing the second clean speech in the preset format and the second noisy speech in the present format by the dividing sub module 463 according to the preset length, such that the second clean speech in the preset format and the second noisy speech in the preset format are divided to speech segments having the same preset length respectively.

The above preset length may be set according to actual requirements and/or system performances when the preset length is implemented. The above preset length is not limited in embodiments of the present disclosure. For example, the above preset length may be 1.25 seconds.

The sampling sub module 464 is configured to sample the divided second clean speeches and the divided second noisy speeches divided by the dividing sub module 463 with the sampling rate indicated by the preset format, to obtain second sampling point information of the second clean speech and third sampling point information of the second noisy speech. In embodiments, after the second clean speech in the preset format and the second noisy speech in the preset format are divided by the dividing sub module 463, the divided second clean speeches and the divided second noisy speeches are sampled by the sampling sub module 464 according to the sampling rate (i.e. 16000 Hz) indicated in the preset format, so as to obtain the second sampling point information of the second clean speech and the third sampling point information of the second noisy speech.

The training sub module 465 is configured to use the third sampling point information of the second noisy speech as an input of a deep-learning model, and to use the second sampling point information of the second clean speech having a corresponding time point as an output of the deep-learning model, so as to train the deep-learning model, to obtain the deep-learning noise reduction model.

In detail, after the second sampling point information of the clean speech and the third sampling point information of the noisy speech are obtained by the sampling sub module 464, the third sampling point information of the noisy speech is used as the input of the deep-learning model and the second sampling point information of the second clean speech with the corresponding time point is used as the output of the deep-learning model via the training sub module 465, so as to train the deep-learning model. That is, the deep-learning noise reduction model may be acquired. Certainly, a process of training the deep-learning model by the training sub module 465 further includes a parameter selection and adjustment, which is not elaborated herein.

The above speech noise reduction device based on AI employs directly the sampling point information as the input and the output of the deep-learning noise reduction mode without operating on the spectrum and complex operations such as estimating noise. Therefore the device is simple to implement. Furthermore, the device may not bring distortion (such as "music" noise), thereby having a better naturalness and acoustic quality and providing better user experience. In addition, by learning a large amount of noisy speeches and clean speeches through the deep-learning model, a capacity of generating the clean speech from the noisy speech using the deep-learning method is applicable to various types of noise and various environments, which has a general applicability and is easily to promote.

Figure 6:
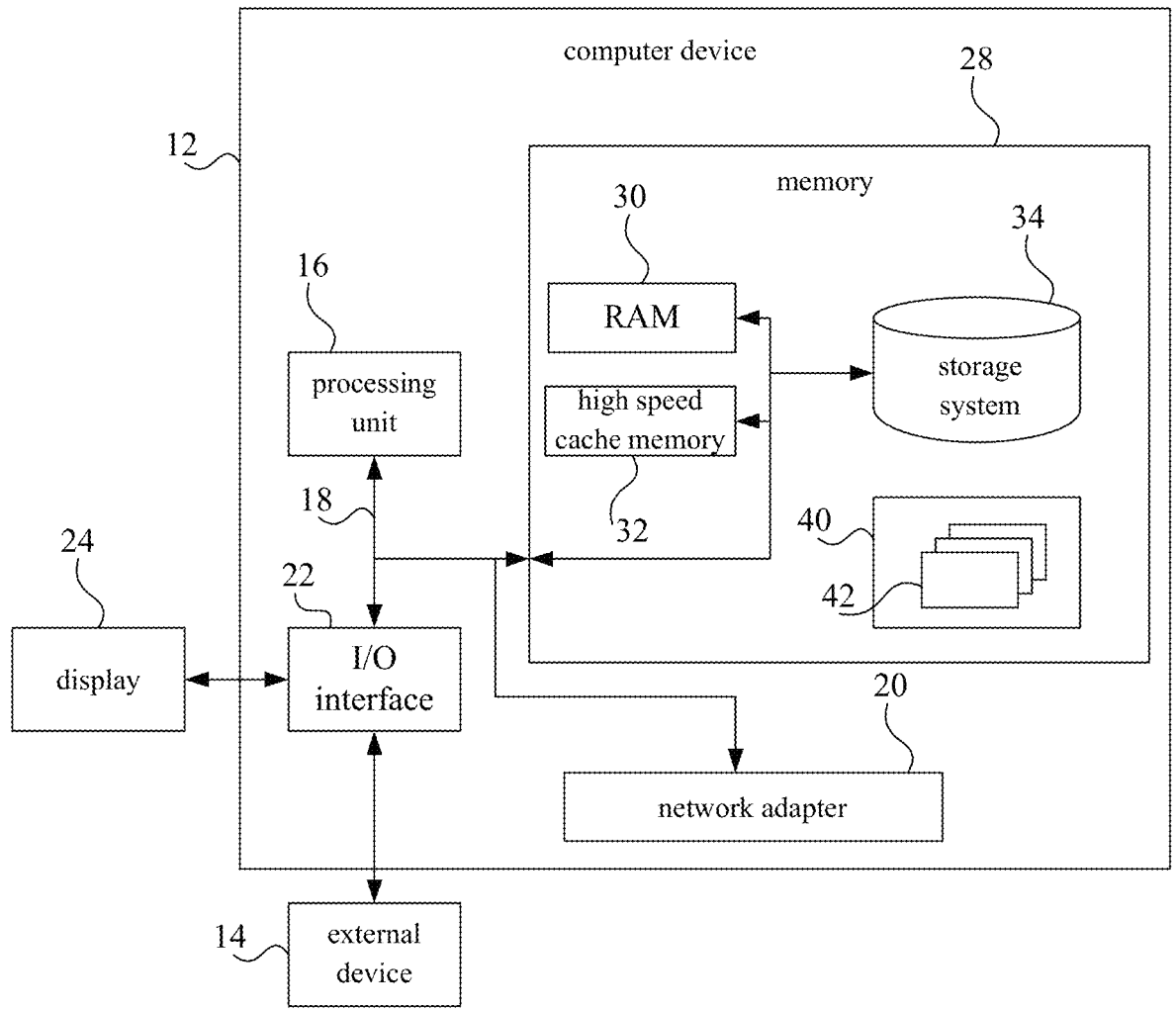
FIG. 6 is a block diagram illustrating a computer device according to an embodiment of the present disclosure.

FIG. 6 is a block diagram illustrating a computer device according to an embodiment of the present disclosure. The computer device in embodiments may be as a client device or may be as a server, for realizing the speech noise reduction method based on AI provided in embodiments of the present disclosure. The above computer device may include: one or more processors; a storage device configured to store one or more programs; a receiver, configured to receive a noisy speech to be processed. When the one or more programs are executed by the one or more processors, the speech noise reduction method based on AI provided in embodiments of the present disclosure is executed by the one or more processors.

FIG. 6 illustrates a block diagram of an exemplary computer device 12 suitable for realizing implementations of the present disclosure. The computer device 12 illustrated in FIG. 6 is merely an example, which should be not understood to limit he functions and usage scope of embodiments of the present disclosure.

As illustrated in FIG. 6, the computer device 12 may be represented via a general computer device form. Components of the computer device 12 may include but be not limited to one or more processors or processing units 16, a system memory 28, a bus 18 connecting various system components including the system memory 28 and the processing units 16.

The bus 18 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The computer device 12 typically includes a variety of computer system readable media. These media may be any available media accessible by the computer device 12 and includes both volatile and non-volatile media, removable and non-removable media.

The system memory 28 may include a computer system readable medium in the form of volatile memory, such as a random access memory (hereinafter referred to as RAM) 30 and/or a high speed cache memory 32. The computer device 12 may further include other removable or non-removable, volatile or non-volatile computer system storage media. By way of example only, the storage system 34 may be configured to read and write a non-removable and non-volatile magnetic media (not shown in FIG. 6, commonly referred to as a "hard drive"). Although not shown in FIG. 6, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of the program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The computer device 12 may also communicate with one or more external devices 14 (such as, a keyboard, a pointing device, a display 24, etc.). Furthermore, the computer device 12 may also communicate with one or more communication devices enabling a user to interact with the computer device 12 and/or other devices (such as a network card, modem, etc.) enabling the computer device 12 to communicate with one or more computer devices. This communication can be performed via the input/output (I/O) interface 22. Also, the computer device 12 may communicate with one or more networks (such as a local area network (hereafter referred to as LAN), a wide area network (hereafter referred to as WAN) and/or a public network such as an Internet) through a network adapter 20. As shown in FIG. 6, the network adapter 20 communicates with other modules of the computer device 12 over the bus 18. It should be understood that, although not shown in FIG. 6, other hardware and/or software modules may be used in connection with the computer device 12. The hardware and/or software includes, but is not limited to, microcode, device drivers, redundant processing units, external disk drive arrays, RAID systems, tap Drive and data backup storage system.

The processing unit 16 is configured to execute various functional applications and data processing by running programs stored in the system memory 28, for example, implementing the speech noise reduction method based on AI provided in embodiments of the present disclosure.

Embodiments of the present disclosure further provide a storage medium including computer executable instructions. When the computer executable instructions are executed by a computer processor, a speech noise reduction method based on AI provided in embodiments of the present disclosure is executed.

The above storage medium including the computer executable instructions may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of a carrier which carries computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

It should be illustrated that, in descriptions of the present disclosure, terms such as "first" and "second" are used herein for purposes of description and are not construed as indicating or implying relative importance or significance. Furthermore, in the description of the present disclosure, "a plurality of" means two or more than two, unless specified otherwise.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A speech noise reduction method based on artificial intelligence, performed by one or more computing devices and comprising:
   receiving a first noisy speech to be processed;
   pre-processing the first noisy speech to be processed, to obtain the first noisy speech in a preset format;
   sampling the first noisy speech in the preset format according to a sampling rate indicated by the preset format, to obtain first sampling point information of the first noisy speech;
   obtaining the deep-learning noise reduction model after training;
   using the first sampling point information of the first noisy speech as an input of the deep-learning noise reduction model and performing a noise reduction on the first sampling point information in a time domain through the deep-learning noise reduction model, to generate noise-reduced first sampling point information having a corresponding time point as an output of the deep-learning noise reduction model; and
   generating a first clean speech according to the noise-reduced first sampling point information,
   wherein the sampling rate indicates the number of the sampling points included in a speech with a period of 1 second,
   wherein obtaining the deep-learning noise reduction model after the train comprises:
   collecting a second clean speech and a second noisy speech corresponding to the second clean speech;
   pre-processing the second clean speech and the second noisy speech corresponding to the second clean speech, to obtain the second clean speech in the preset format and the second noisy speech in the preset format;
   dividing the second clean speech in the preset format and the second noisy speech in the preset format according to a preset length to obtain divided second clean speeches and divided second noisy speeches;
   sampling the divided second clean speeches and the divided second noisy speeches with the sampling rate indicated by the preset format, to obtain second sampling point information of the second clean speech and third sampling point information of the second noisy speech; and
   using the third sampling point information of the second noisy speech as an input of a deep-learning model, and using the second sampling point information of the second clean speech having a corresponding time point as an output of the deep-learning model, so as to train the deep-learning model, to obtain the deep-learning noise reduction model.

2. The method according to claim 1, wherein collecting the second noisy speech corresponding to the second clean speech comprises:
   adding noise to the second clean speech to collect the second noisy speech corresponding to the second clean speech.

3. The method according to claim 1, wherein the preset format is a pulse code modulation format with a sampling rate of 16000 Hz, 16-bit quantization, and a single channel.

4. The method according to claim 1, wherein the preset format is a pulse code modulation format with a sampling rate of 16000 Hz, 16-bit quantization, and a single channel.

5. The method according to claim 1, wherein the preset format is a pulse code modulation format with a sampling rate of 16000 Hz, 16-bit quantization, and a single channel.

6. The method according to claim 2, wherein the preset format is a pulse code modulation format with a sampling rate of 16000 Hz, 16-bit quantization, and a single channel.

7. A computer device, comprising:
one or more processors;
a storage device, configured to store one or more programs;
a receiver, configured to receive a first noisy speech to be processed;
wherein the one or more processors are configured to read the one or more programs stored in the storage device to perform acts of:
pre-processing the first noisy speech to be processed, to obtain the first noisy speech in a preset format;
sampling the first noisy speech in the preset format according to a sampling rate indicated by the preset format, to obtain first sampling point information of the first noisy speech;
obtaining the deep-learning noise reduction model after training;
using the first sampling point information of the first noisy speech as an input of the deep-learning noise reduction model and performing a noise reduction on the first sampling point information in a time domain through the deep-learning noise reduction model, to generate noise-reduced first sampling point information having a corresponding time point as an output of the deep-learning noise reduction model; and
generating a first clean speech according to the noise-reduced first sampling point information,
wherein the sampling rate indicates the number of the sampling points included in a speech with a period of 1 second,
wherein obtaining the deep-learning noise reduction model after the train comprises:
collecting a second clean speech and a second noisy speech corresponding to the second clean speech;
pre-processing the second clean speech and the second noisy speech corresponding to the second clean speech, to obtain the second clean speech in the preset format and the second noisy speech in the preset format;
dividing the second clean speech in the preset format and the second noisy speech in the preset format according to a preset length to obtain divided second clean speeches and divided second noisy speeches;
sampling the divided second clean speeches and the divided second noisy speeches with the sampling rate indicated by the preset format, to obtain second sampling point information of the second clean speech and third sampling point information of the second noisy speech; and
using the third sampling point information of the second noisy speech as an input of a deep-learning model, and using the second sampling point information of the second clean speech having a corresponding time point as an output of the deep-learning model, so as to train the deep-learning model, to obtain the deep-learning noise reduction model.

8. The computer device according to claim 7, wherein collecting the second noisy speech corresponding to the second clean speech comprises:
adding noise to the second clean speech to collect the second noisy speech corresponding to the second clean speech.

9. The computer device according to claim 7, wherein the preset format is a pulse code modulation format with a sampling rate of 16000 Hz, 16-bit quantization, and a single channel.

10. A non-transitory storage medium comprising computer executable instructions, wherein when the computer executable instructions are executed by a computer processor, a speech noise reduction method based on artificial intelligence is executed, and the method comprises:
receiving a first noisy speech to be processed;
pre-processing the first noisy speech to be processed, to obtain the first noisy speech in a preset format;
sampling the first noisy speech in the preset format according to a sampling rate indicated by the preset format, to obtain first sampling point information of the first noisy speech;
obtaining a deep-learning noise reduction model after training;
using the first sampling point information of the first noisy speech as an input of the deep-learning noise reduction model and performing a noise reduction on the first sampling point information in a time domain through the deep-learning noise reduction model, to generate noise-reduced first sampling point information having a corresponding time point as an output of the deep-learning noise reduction model; and
generating a first clean speech according to the noise-reduced first sampling point information,
wherein the sampling rate indicates the number of the sampling points included in a speech with a period of 1 second,
wherein obtaining the deep-learning noise reduction model after the train comprises:
collecting a second clean speech and a second noisy speech corresponding to the second clean speech;
pre-processing the second clean speech and the second noisy speech corresponding to the second clean speech, to obtain the second clean speech in the preset format and the second noisy speech in the preset format;
dividing the second clean speech in the preset format and the second noisy speech in the preset format according to a preset length to obtain divided second clean speeches and divided second noisy speeches;
sampling the divided second clean speeches and the divided second noisy speeches with the sampling rate indicated by the preset format, to obtain second sampling point information of the second clean speech and third sampling point information of the second noisy speech; and
using the third sampling point information of the second noisy speech as an input of a deep-learning model, and using the second sampling point information of the second clean speech having a corresponding time point as an output of the deep-learning model, so as to train the deep-learning model, to obtain the deep-learning noise reduction model.

11. The non-transitory storage medium according to claim 10, wherein collecting the second noisy speech corresponding to the second clean speech comprises:
adding noise to the second clean speech to collect the second noisy speech corresponding to the second clean speech.

12. The non-transitory storage medium according to claim 10, wherein the preset format is a pulse code modulation format with a sampling rate of 16000 Hz, 16-bit quantization, and a single channel.

* * * * *